(12) United States Patent
Kimura

(10) Patent No.: US 10,699,672 B2
(45) Date of Patent: Jun. 30, 2020

(54) DISPLAY DEVICE

(71) Applicant: MITSUMI ELECTRIC CO., LTD., Tokyo (JP)

(72) Inventor: Yuji Kimura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/092,251

(22) PCT Filed: Apr. 4, 2017

(86) PCT No.: PCT/JP2017/014137
§ 371 (c)(1),
(2) Date: Oct. 9, 2018

(87) PCT Pub. No.: WO2017/183446
PCT Pub. Date: Oct. 26, 2017

(65) Prior Publication Data
US 2019/0122635 A1    Apr. 25, 2019

(30) Foreign Application Priority Data
Apr. 22, 2016  (JP) .................................. 2016-085904

(51) Int. Cl.
*G09G 5/10*      (2006.01)
*G02B 26/02*     (2006.01)
(Continued)

(52) U.S. Cl.
CPC ............ *G09G 5/10* (2013.01); *G02B 26/023* (2013.01); *G02B 27/0172* (2013.01);
(Continued)

(58) Field of Classification Search
CPC .......... G02B 2027/0118; G02B 26/023; G02B 26/0858; G02B 26/105; G02B 27/0172;
(Continued)

(56) References Cited

U.S. PATENT DOCUMENTS

2012/0105310 A1    5/2012  Sverdrup et al.
2014/0293245 A1   10/2014  Tani
(Continued)

FOREIGN PATENT DOCUMENTS

JP    H5-300451     11/1993
JP    H11-109882     4/1999
(Continued)

OTHER PUBLICATIONS

International Search Report for PCT/JP2017/014137 dated Jun. 13, 2017.
Japanese Office Action for 2016-085904 dated Mar. 17, 2020.

Primary Examiner — Kenneth Bukowski
(74) Attorney, Agent, or Firm — IPUSA, PLLC

(57) ABSTRACT

The invention has an object to provide a display device that enables a user to obtain information from a projection image without losing information obtained from the surrounding environment.
The display device is to be mounted on a head of the user for allowing the user to view a predetermined image, and includes a light quantity detector (17) to detect a quantity of external light; a laser (211R, 211G, 211B) to emit a laser light having a light quantity depending on a current value; a light attenuator (22) including filters to switch an attenuation ratio so as to attenuate the laser light; an optical scanner (15) to scan the laser light transmitted through the filter; an optical projection system (16) to project the scanned laser light to form an image; and a controller (27) to control brightness of the image by increasing or decreasing the current value and by switching the attenuation ratio of the filter, based on the light quantity of the external light detected by the light quantity detector.

8 Claims, 6 Drawing Sheets

(51) Int. Cl.
*G09G 3/00* (2006.01)
*H04N 5/74* (2006.01)
*G02B 27/01* (2006.01)
*G09G 3/02* (2006.01)
*G02B 26/10* (2006.01)
*G02B 26/08* (2006.01)
*H04N 5/64* (2006.01)

(52) U.S. Cl.
CPC .............. *G09G 3/001* (2013.01); *G09G 3/025* (2013.01); *H04N 5/7491* (2013.01); *G02B 26/0858* (2013.01); *G02B 26/105* (2013.01); *G02B 2027/0118* (2013.01); *G09G 2320/0626* (2013.01); *G09G 2360/144* (2013.01); *H04N 5/64* (2013.01)

(58) Field of Classification Search
CPC ..... G09G 2320/0626; G09G 2360/144; G09G 3/001; G09G 3/025; G09G 5/10; H04N 5/64; H04N 5/7491
See application file for complete search history.

(56) References Cited

U.S. PATENT DOCUMENTS

| | | | |
|---|---|---|---|
| 2015/0062345 | A1 | 3/2015 | Kusanagi |
| 2015/0103059 | A1* | 4/2015 | Jung .................. G09G 5/00 345/207 |
| 2015/0116601 | A1* | 4/2015 | Wang ................ H04N 5/7408 348/744 |
| 2017/0052369 | A1* | 2/2017 | Shimatani ............ B60K 35/00 |

FOREIGN PATENT DOCUMENTS

| | | |
|---|---|---|
| JP | 2004-226870 | 8/2004 |
| JP | 2005-107125 | 4/2005 |
| JP | 2007-101618 | 4/2007 |
| JP | 2007-264324 | 10/2007 |
| JP | 2009-086365 | 4/2009 |
| JP | 2012-212023 | 11/2012 |
| JP | 2014-48396 | 3/2014 |
| JP | 2014-195184 | 10/2014 |
| JP | 2015-049266 | 3/2015 |

* cited by examiner

DISPLAY DEVICE

TECHNICAL FIELD

The present invention relates to a display device.

BACKGROUND ART

Conventionally, a display device has been known that is attached to the head of a user, and allows the user to view a predetermined image. For example, there has been a display device that is capable of projecting an image by laser light relatively clearly even in a bright surrounding environment, by placing a light attenuation filter with respect to external light (see, for example, Patent Document 1).

RELATED-ART DOCUMENTS

Patent Documents

[Patent Document 1] Japanese Unexamined Patent Application Publication No. 2007-264324

SUMMARY OF THE INVENTION

Problem to be Solved by the Invention

However, in the display device described above, surrounding information other than the laser light is blocked. Therefore, it may be difficult to apply the display device to applications in which information brought by the laser light overlaps the surrounding information, for example, operational support while walking or driving.

The present invention has been made in view of the above respects, and has an object to provide a display device that enables a user to obtain information from a projection image without losing information obtained from the surroundings.

Means for Solving the Problem

The display device (1) is a display device (1) to be mounted on a head of a user for allowing the user to view a predetermined image, and includes a light quantity detector (17) configured to detect a quantity of external light; a laser (211R, 211G, 211B) configured to emit a laser light having a light quantity depending on a current value; a light attenuator (22) including a plurality of filters (221 to 227) configured to switch an attenuation ratio so as to attenuate the laser light; an optical scanner (15) configured to scan the laser light transmitted through the filter; an optical projection system (16) configured to project the scanned laser light to form an image; and a controller (27) configured to control brightness of the image by increasing or decreasing the current value and by switching the attenuation ratio of the filters (221 to 227), based on the light quantity of the external light detected by the light quantity detector (17).

Note that the reference codes in the above parentheses are attached for the sake of easier understandability, namely, merely examples, and the embodiments are not limited as illustrated.

Advantage of the Invention

According to the disclosed technology, it is possible to provide a display device that enables a user to obtain information from a projection image without losing information obtained from the surroundings.

DETAILED DESCRIPTION OF THE PREFERRED EMBODIMENTS

In the following, embodiments for carrying out the invention will be described with reference to the drawings. Throughout the drawings, the same elements may be assigned the same reference codes, and duplicated description may be omitted.

(Outline of Display Device)

Figure 1:
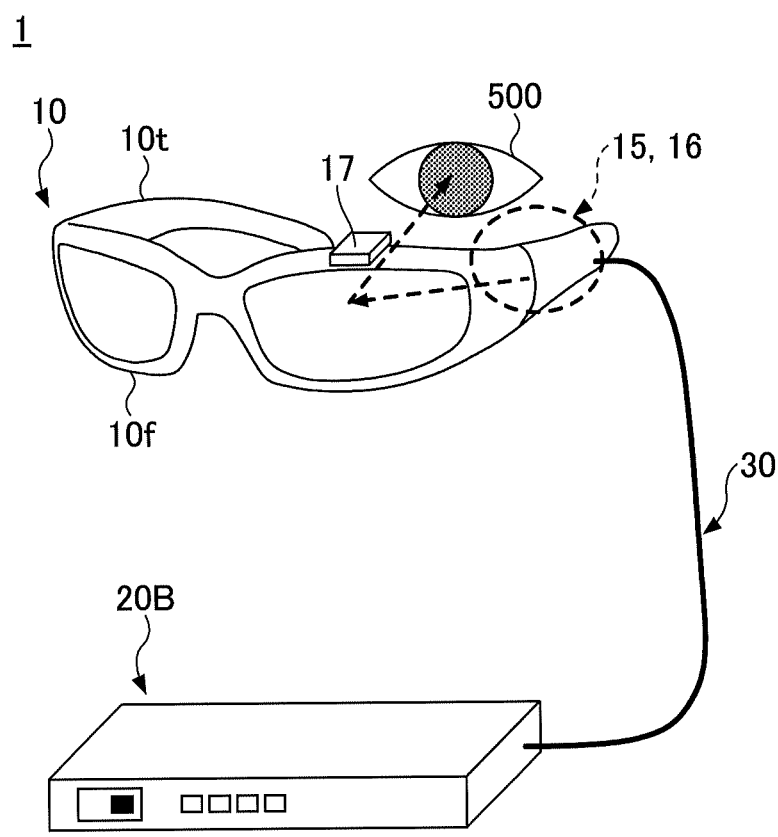
FIG. 1 is a perspective view exemplifying an appearance of a display device according to an embodiment.
Figure 2:
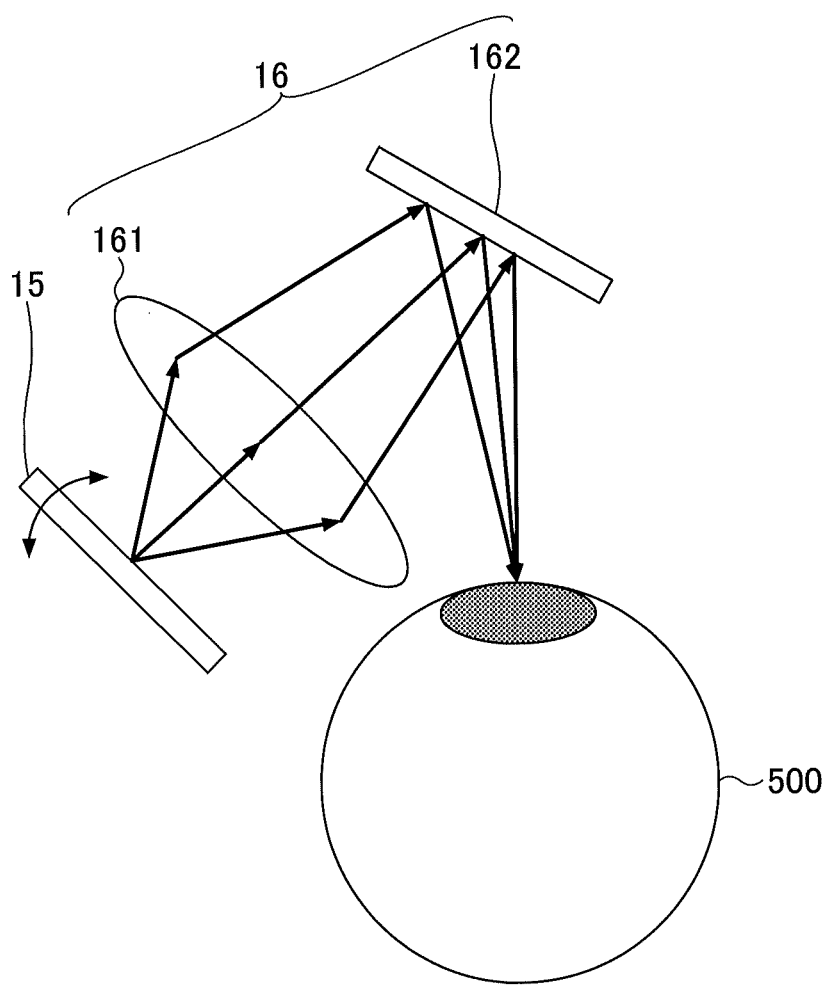
FIG. 2 is a schematic view exemplifying an optical projection system of a display device according to the embodiment.

FIG. 1 is a perspective view exemplifying an appearance of a display device according to an embodiment. FIG. 2 is a schematic diagram exemplifying an optical projection system of the display device according to the embodiment.

A display device 1 illustrated in FIG. 1 and FIG. 2 is a retinal-scanning, head-mounted display that directly projects an image on the retina of the user's eye.

The display device 1 can be used as, for example, a device for allowing a user to visually recognize information for supporting operations, which has been recorded on a database or the like in advance. Alternatively, a camera module may be provided in the display device 1 to be used as a device for allowing the user to visually recognize information obtained by the camera module. Alternatively, it may be a device having both functions.

The display device 1 has, as main components, an attachment part 10 that can be attached to the head of a user (wearer) and a control box 20B that has a control device 20 (described later) built in to control the attachment part 10. The control box 20B is, for example, a rectangular parallelepiped casing, and may provide various switches, a display unit, and the like as necessary. The attachment part 10 and the control device 20 in the control box 20B are connected by a transmission cable 30 including an optical fiber and an electric wire.

In the embodiment, as an example, the attachment part 10 has a shape of, for example, eyeglasses, and is constituted with a pair of fronts 10f and a pair of temples 10t arranged substantially symmetrically, on the right and left. The front 10f holds a lens (including the case of the lens power being zero).

A light quantity detection sensor 17 is placed on the front 10f or the temple 10t. The light quantity detection sensor 17 is a light quantity detector to detect the light quantity (the quantity of external light) around the user of the attachment part 10. As the light quantity detection sensor 17, for example, a photodiode or the like may be used. In the case where a camera module is mounted on the attachment part 10, the camera module may be used as the light quantity detection sensor without separately providing the light quantity detection sensor 17.

One of the left and right temples 10t (the left eye side in FIG. 1) has an optical projection system 16 mounted, which includes an optical scanner 15, a lens 161, and a half mirror 162 illustrated in FIG. 2. In other words, the display device 1 has the optical scanner 15 and the optical projection system 16 mounted only on the side of one of the eyes. The optical scanner 15 and the optical projection system 16 can be placed on either of the right eye side or the left eye side, and have a function to project an image on the retina of the eye on the placed side.

The optical scanner 15 scans an incident laser light two-dimensionally, and the scanned laser light is directly projected onto the retina of an eyeball 500 of the wearer of the display device 1 via the lens 161 and the half mirror 162, to form a two-dimensional image.

The optical scanner 15 includes one mirror that swings with respect to, for example, two orthogonal axes. The optical scanner 15 may be, for example, MEMS (Micro Electro Mechanical Systems) manufactured by a semiconductor process or the like. The mirror of the optical scanner 15 may be driven by, for example, an actuator that uses the deforming force of a piezoelectric element as the driving force. Note that the optical projection system 16 may include optical components other than the lens 161 and the half mirror 162.

Figure 3:
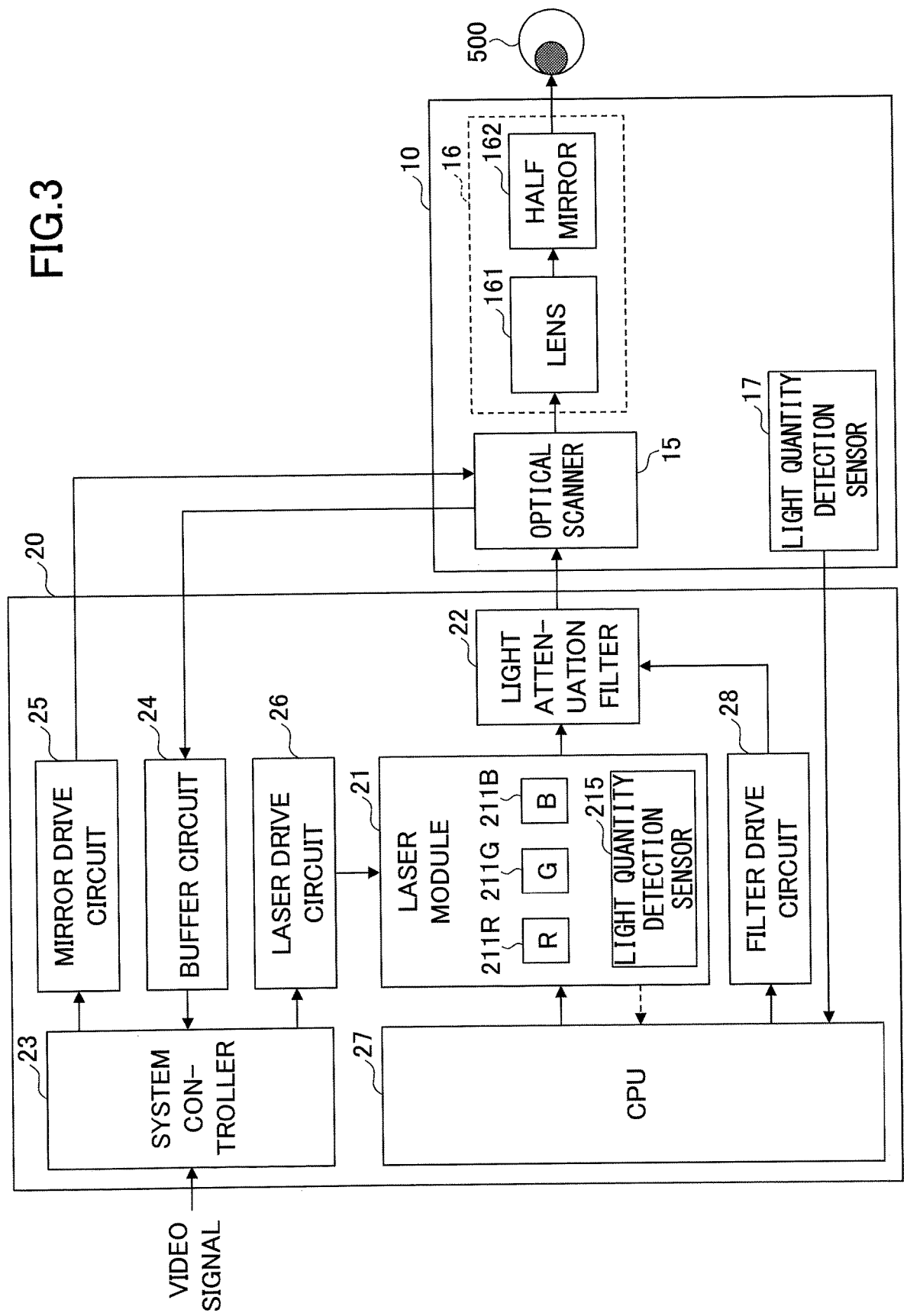
FIG. 3 is an example of a block diagram illustrating a control device according to the embodiment.

FIG. 3 is an example of a block diagram illustrating the control device according to the embodiment. As illustrated in FIG. 3, in the control device 20, the laser module 21 includes lasers 211R, 211G, and 211B each of which emits a laser light with a light quantity depending on a current value; and a light quantity detection sensor 215 to monitor the light quantity of each of the lasers 211R, 211G, and 211B that has been emitted most recently.

The laser 211R is, for example, a red semiconductor laser, and can emit light having a wavelength λR (e.g., 640 nm). The laser 211G is, for example, a green semiconductor laser, and can emit light having a wavelength λG (e.g., 530 nm). The laser 211B is, for example, a blue semiconductor laser, and can emit light having a wavelength λB (e.g., 445 nm).

As the light quantity detection sensor 215, for example, a photodiode or the like may be used. The light quantity detection sensor 215 may be placed at any position as long as the laser light quantity can be detected before transmitting through the light attenuation filter 22 as a light attenuator.

The laser lights of the respective wavelengths emitted from the lasers 211R, 211G, and 211B are synthesized by a dichroic mirror or the like and are incident on the light attenuation filter 22.

The light attenuation filter 22 is configured to be capable of switching between multiple filters having different light attenuation ratios. By selecting one of the multiple filters constituting the light attenuation filter 22, it is possible to attenuate the light (synthesized light) emitted from the lasers 211R, 211G, and 211B by a predetermined attenuation ratio. However, the multiple filters constituting the light attenuation filter 22 may include a filter that is specified to transmit substantially 100% of an incident light. As such, the light attenuation filter 22 has a function of controlling the brightness of an image visually recognized by the user of the display device 1. The light attenuation filter 22 is, for example, an ND (Neutral Density) filter.

Figure 4:
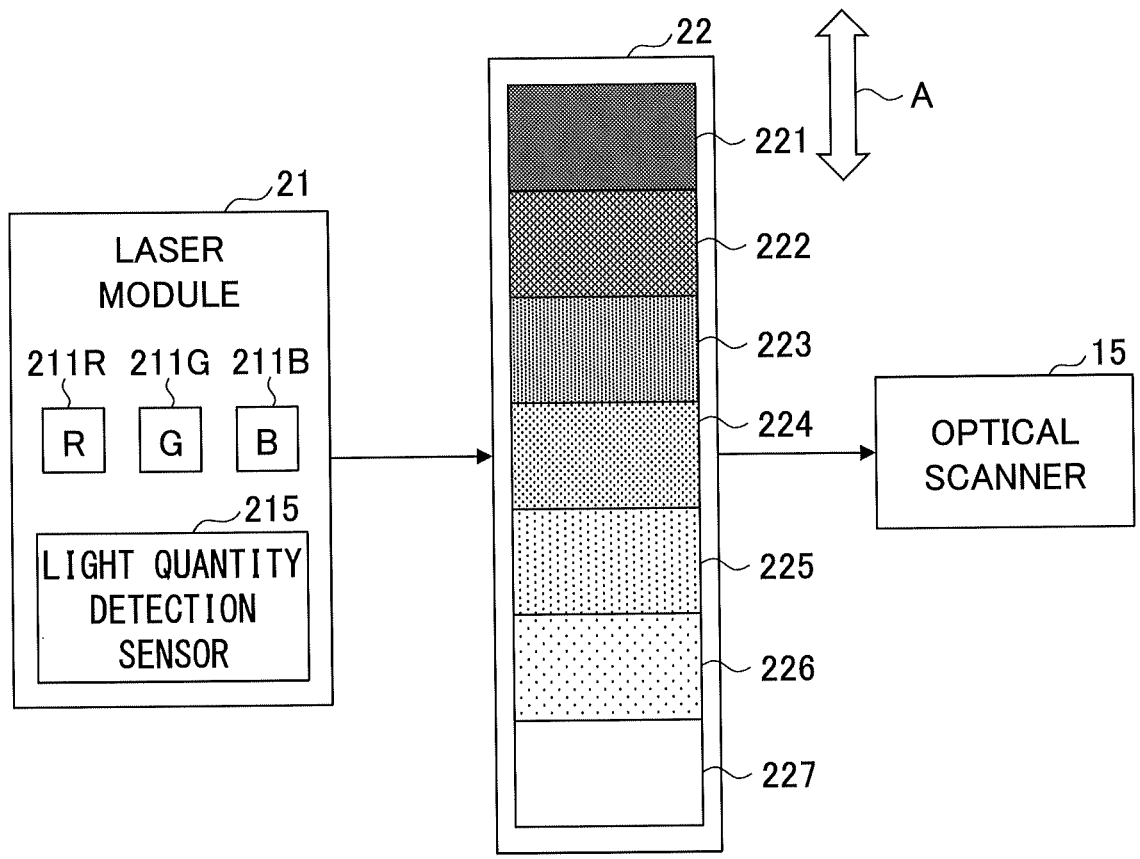
FIG. 4 is a schematic view exemplifying a configuration of a light attenuation filter according to the embodiment.

The light attenuation filter 22 may have a configuration, for example, as illustrated in FIG. 4. In the example in FIG. 4, the light attenuation filter 22 includes seven filters of filters 221 to 227, which are set such that the light attenuation ratio decreases (the transmittance increases) from the filter 221 to 226. Also, the transmittance of the filter 227 is set to approximately 100%. The light attenuation filter 22 is configured to be movable in the direction of an arrow A by, for example, a stepping motor. However, the number of filters is not limited to seven and can be any number in accordance with a required specification.

In this way, the light attenuation filter 22 may have a structure in which between the filter 221 having the highest attenuation ratio and the filter 227 having the lowest attenuation ratio, the multiple filters 222 to 226 are arranged in a row so that the attenuation ratio varies in stages. Selectively placing one of the filters 221 to 227 on the optical path of a laser light by mechanical means using, for example, a stepping motor or the like, enables to attenuate the laser light by a predetermined attenuation ratio. Note that the attenuation ratio is a ratio of the light quantity incident on each filter to the light quantity emitted from the filter.

Referring back to FIG. 3, the system controller 23 can control, for example, the deflection angle of a mirror (not illustrated) of the optical scanner 15. The system controller 23 can monitor, via the buffer circuit 24, inclinations in the horizontal direction and in the vertical direction of the mirror of the optical scanner 15 obtained by, for example, a horizontal displacement sensor (not illustrated) and a vertical displacement sensor (not illustrated) provided in the optical scanner 15, to supply an angle control signal to mirror drive circuit 25. Then, the mirror drive circuit 25 can drive (scan) the mirror of the optical scanner 15 to a predetermined angle, based on the angle control signal from the system controller 23.

In addition, the system controller 23 can supply, for example, a drive signal corresponding to a digital video signal input from the outside of the control device to the laser drive circuit 26. The outside of the control device is, for example, a personal computer, a camera module, or the like.

The laser drive circuit 26 supplies predetermined currents to the lasers 211R, 211G, and 211B of the laser module 21 based on a drive signal from the system controller 23. This causes the lasers 211R, 211G, and 211B to emit red, green, and blue light modulated according to the video signal, and by synthesizing these, it is possible to form a color image corresponding to the digital video signal input from the outside of the control device.

The output of the light quantity detection sensor 17 of the attachment part 10 (the quantity of external light) is input into the CPU 27 as a controller, via the transmission cable 30. The CPU 27 increases or decreases the current value of each of the lasers 211R, 211G, and 211B based on the quantity of external light detected by the light quantity detection sensor 17, and performs switching among multiple filters constituting the light attenuation filter 22 to control the brightness of an image visually recognized by the user.

Specifically, the CPU 27 monitors the light quantity (the quantity of external light) around the user of the attachment part 10 by the output of the light quantity detection sensor 17, and based on the light quantity of external light, supplies a light quantity control signal to the laser module 21 to increase or decrease the current value of each of the lasers 211R, 211G, and 211B.

In addition, the CPU 27 monitors the light quantity around the user of the attachment part 10 (the quantity of external light) by the output of the light quantity detection sensor 17, and based on the light quantity of external light, supplies a switching signal to the filter drive circuit 28 to switch the light attenuation filter 22. For example, in the case where the light attenuation filter 22 is configured to be movable by a stepping motor, the filter drive circuit 28 can supply a switching signal to the stepping motor to select a predetermined filter of the light attenuation filter 22.

Also, the CPU 27 may monitor the quantity of emitted light, for example, at the base of the lasers 211R, 211G, and 211B by the output of the light quantity detection sensor 215, to supply a light quantity control signal to the laser module 21. Currents in the lasers 211R, 211G, and 211B are controlled so as to obtain a predetermined output (light quantity) based on the light quantity control signal from the CPU 27. Here, the predetermined output is a target light quantity determined based on the light quantity of the external light detected by the light quantity detection sensor 17, and a quantity deviated from the determined target light quantity is fed back to be controlled, based on the output of the light quantity detection sensor 215.

Note that the light quantity detection sensor 215 may be configured to include three sensors that independently detect the quantities of light emitted from the lasers 211R, 211G, and 211B, respectively. Alternatively, the light quantity detection sensor 215 may be configured to include only one sensor. In this case, by having the lasers 211R, 211G, and 211B sequentially emit light to be sequentially detected by the one sensor, it is possible to control the light quantity emitted from the lasers 211R, 211G, and 211B.

The laser light transmitted through one of the multiple filters constituting the light attenuation filter 22, via an optical fiber (not illustrated) in the transmission cable 30, illuminates the mirror of the optical scanner 15 of the attachment part 10, to be scanned. The laser light scanned on the mirror of the optical scanner 15 is directly projected onto the retina of the user of the attachment part 10 by the optical projection system 16 to form an image, and thereby, the user can visually recognize the image having a predetermined brightness.

Although corresponding arrows are omitted in FIG. 3, the CPU 27 is specified to be also connected with the system controller 23, the buffer circuit 24, the mirror drive circuit 25, and the laser drive circuit 26, to perform initial settings of these components (setting of a range of voltage values to be output, etc.).

(Control of Laser Light Quantity and Light Attenuation Filter)

Figure 5:
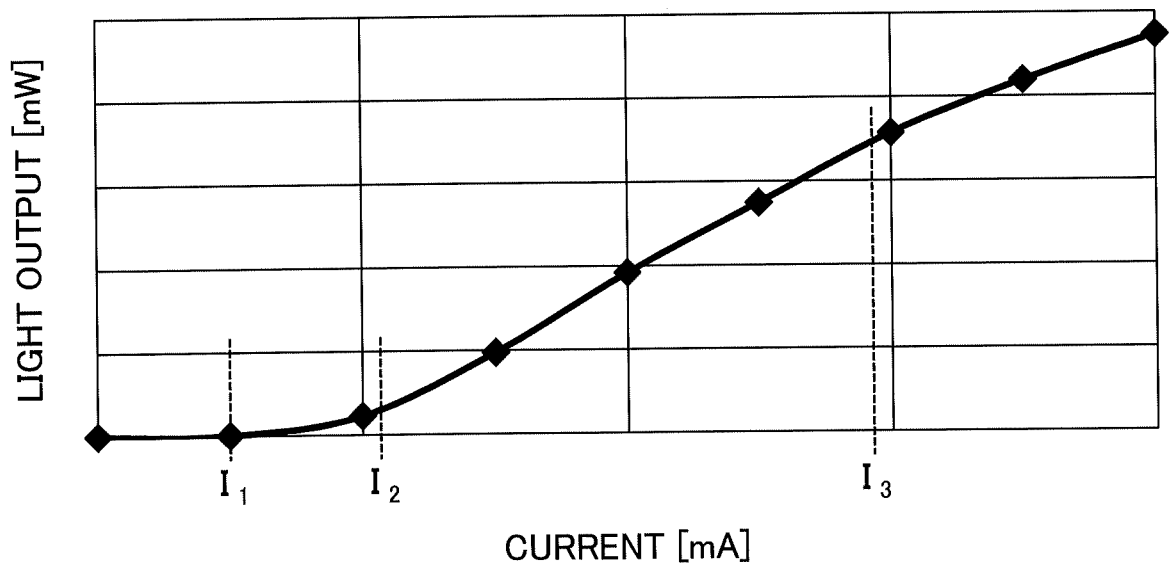
FIG. 5 is a diagram illustrating an example of a relationship between the input current of a laser and the light output (light quantity)

FIG. 5 is a diagram illustrating an example of a relationship (so-called "I-L characteristics") between the input current of a laser and the light output (light quantity). The laser starts emitting light at a point where a specific current (threshold current) is applied to the laser. Until a certain current is applied, the relationship between the current and the optical output is nonlinear. For example, in FIG. 5, the relationship between the laser current and the light output (light quantity) is nonlinear in a region from a current I1 to a current I2.

In the nonlinear region, even if it is intended to produce a desired brightness, the brightness may be more or less intense than desired in practice. The display device 1 presents all colors by synthesizing three R/G/B colors of laser lights; however, if the nonlinear region is used, the output of R/G/B becomes imbalanced, and hence, an expected color cannot be obtained. Therefore, it is necessary to avoid using the nonlinear region as much as possible in the lasers of R/G/B.

If the current flows through a laser excessively, the light output is saturated and again becomes nonlinear. A region that is nonlinear with an excessive flow of the current is also not suitable for use. Therefore, it is desirable to provide a limit of the current value flowing to each of the R/G/B lasers, and to increase or decrease the current value of the laser to constantly fall in a region where the relationship between the laser current and the light output (light quantity) is linear.

Figure 6:
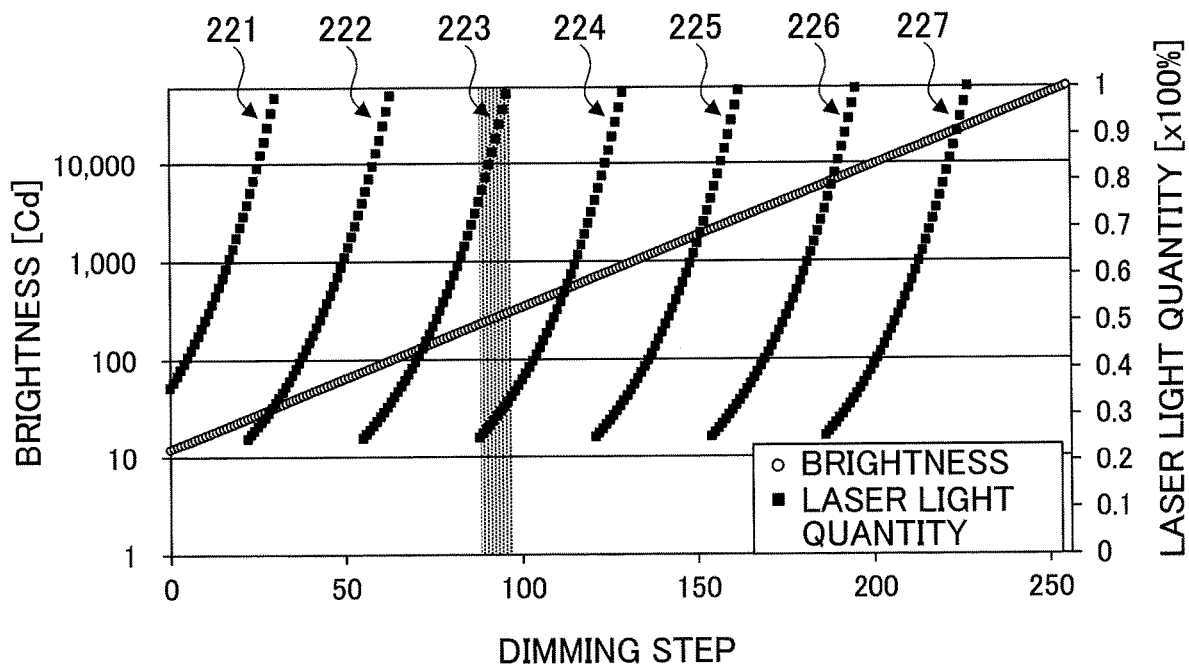
FIG. 6 is a diagram illustrating control of the brightness.

FIG. 6 is a diagram describing control of the brightness, which illustrates an example of a relationship between the laser light quantity for a dimming step for obtaining a desired brightness and the filters constituting the light attenuation filter. Here, assume that the light attenuation filter includes the seven filters 221 to 227 having different light attenuation ratios as illustrated in FIG. 4. In FIG. 6, a straight line (continuous round dots) tilted upward to the right represents the required brightness of an image, and each square dot represents a laser light quantity that has passed through the filters.

In the example in FIG. 6, the filters 221 to 227 are specified to switch the brightness in 256 dimming steps of a dimming step 0 (DS0) to a dimming step 255 (DS255). However, the steps are not limited as such; and may be designed to switch the brightness at any dimming steps of 128, 64, 32, or the like, in accordance with a required specification.

Figure 7:
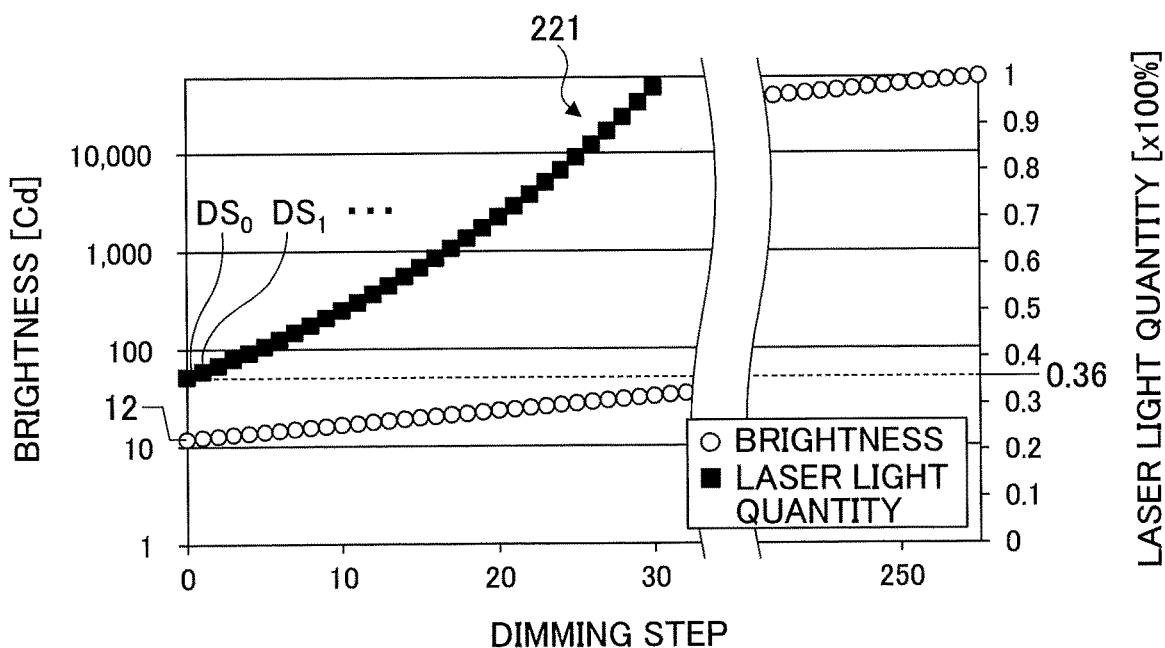
FIG. 7 is an enlarged view of the vicinity of a filter 221 in FIG. 6.

FIG. 7 is an enlarged view of the vicinity of the filter 221 in FIG. 6. As illustrated in FIG. 7, by selecting the filter 221 having the highest attenuation ratio and setting the laser light quantity to 36% at DS0, the brightness of 12 cd can be realized. As the dimming step is increased to become DS1, DS2, and so on, the laser light quantity increases and the brightness gradually increases.

When the dimming step reaches a step at which the brightness becomes the maximum with the filter 221, the laser light quantity is lowered, and then, switching is performed to the filter 222 having a lower attenuation ratio so that a further higher brightness can be obtained. Note that 100% of the laser light quantity on the axis on the right side in FIGS. 6 and 7 may be set as, for example, a light output corresponding to a current I3 in FIG. 5.

Referring to FIG. 6, in order to realize the brightness of 12 cd, it is seemingly feasible to select the filter 222 having a lower attenuation ratio than the filter 221, and to reduce the laser light quantity to around 10%. However, as the input current is lowered in order to lower the laser light quantity, the current reaches the nonlinear region of the I-L characteristics (e.g., the region between the current I1 and the current I2 in FIG. 5), and it becomes difficult to obtain a desired light quantity in practice. Therefore, the laser light quantity is practically designed to be limited around 25% at the lowest.

Suppose that the filter 222 is selected, and the white balance is adjusted at the brightness of 12 cd using the nonlinear region of the I-L characteristics. In this case, the white balance of an intermediate tone (gray balance) cannot be adjusted necessarily, and an image may look, for example, reddish or the like. On the other hand, in the case where the filter 221 is selected to realize the brightness of 12 cd, since the linear region of the I-L characteristics (e.g., the region between the current I2 and the current I3 in FIG. 5) can be used, and thereby, the white balance of the intermediate tone can also be adjusted within the range of the specification.

Also, a portion illustrated with a fine dot pattern between the filter 223 and the filter 224 in FIG. 6 indicates that two ways are available in selecting a light attenuation filter at a desired dimming step.

The fact that two ways are available in selecting a light attenuation filter at a desired dimming step is not limited to the filter 223 and the filter 224, and the same applies to the other filters having the attenuation ratios adjacent to each other. In other words, a combination surely exists such that the brightness of an image in the case of selecting one filter having an attenuation ratio among the multiple filters, and setting a first current value in the laser, is equivalent to the brightness of the image in the case of selecting another filter having another attenuation ratio adjacent to the attenuation ratio of the one filter, and setting a second current value in the laser.

This is an overlap provided for achieving an object to control the laser light quantity (LDAPC: Laser Diode Auto Power Control) in the case where there is a difference between an expected laser light quantity and an actually obtained laser light quantity due to a change caused by ambient temperature, aging of the laser, and the like.

If no overlap is provided, there is likelihood that the light attenuation filter is frequently switched when there is a difference in the laser light quantity. However, the overlapping enables to control the laser light quantity only by switching the laser current while the light attenuation filter remains unchanged. The amount of overlap may be set to, for example, around 20 to 30% of the dimming steps of each filter.

Figure 8:
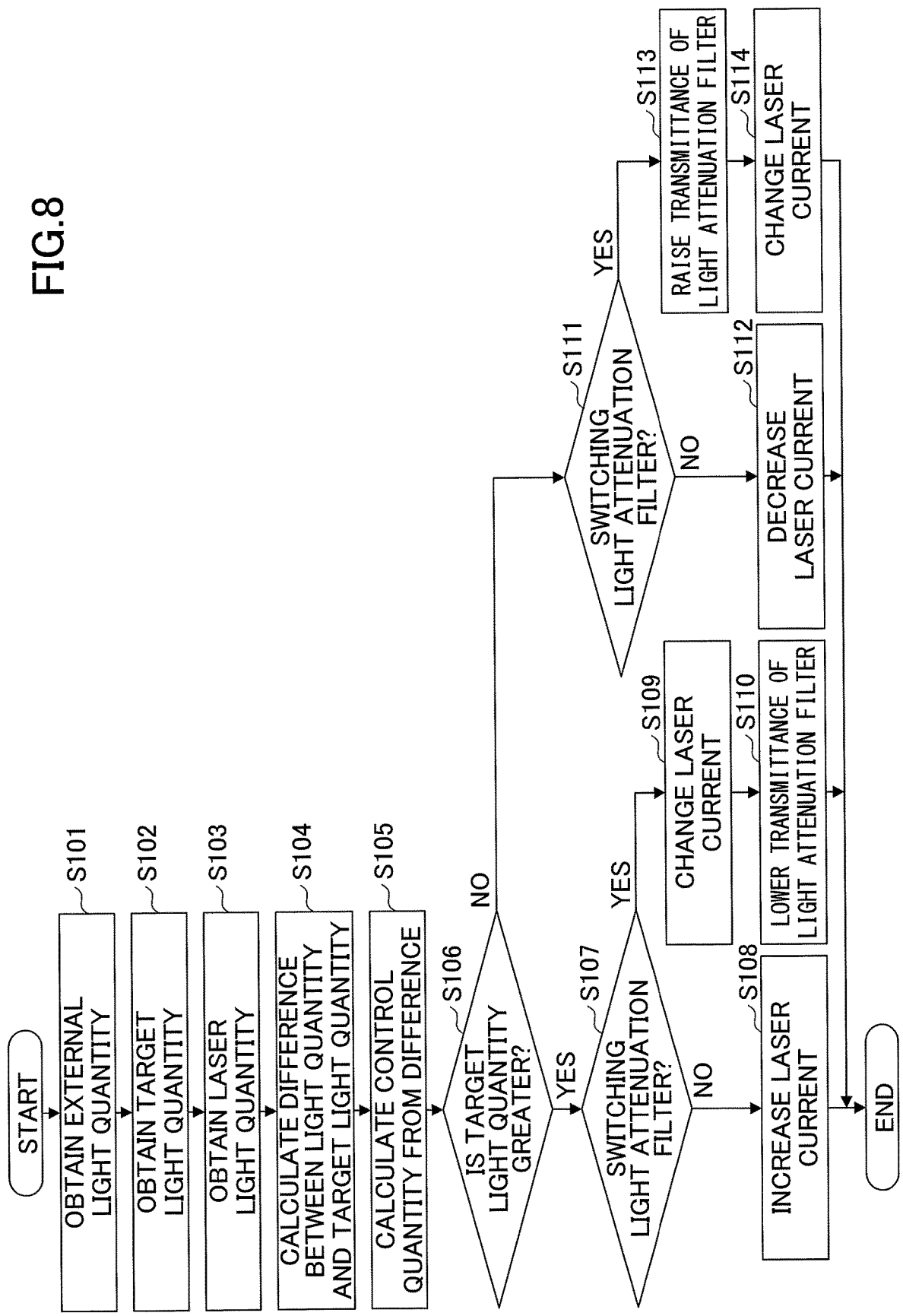
FIG. 8 is an example of a flowchart of control of a laser current and switching of light attenuation filters.

FIG. 8 is an example of a flowchart of control of the laser current and switching of the light attenuation filters. First, at Step S101, the CPU 27 obtains an external light quantity from the light quantity detection sensor 17. Next, at Step S102, the CPU 27 calculates a target light quantity of each of the lasers based on the external light quantity obtained at Step S101.

Next, at Step S103, the CPU 27 obtains the light quantity of each of the lasers (lasers 211R, 211G, and 211B) from the light quantity detection sensor 215. Next, at Step S104, the CPU 27 calculates a difference between the light quantity of each of the lasers obtained at Step S103 and the target light quantity calculated at Step S102. Next, at Step S105, the CPU 27 calculates a control quantity (a current value of each of the lasers) from the difference calculated at Step S104.

Next, at Step S106, the CPU 27 determines whether the target light quantity calculated at Step S102 is greater than the light quantity of each of the lasers obtained at Step S103. If it has been determined at Step S106 that the target light quantity is greater (the case of YES), the process proceeds to Step S107; or if it has been determined at Step S106 that the target light quantity is less than or equal to the target light quantity (the case of NO), the process proceeds to Step S111.

Next, at Step S107, the CPU 27 determines whether or not to perform switching of the light attenuation filter. If it has been determined at Step S107 that switching of the light attenuation filter is not to be performed (the case of NO), the process proceeds to Step S108, and the CPU 27 supplies a light quantity control signal to the laser module 21 to increase the current of each of the lasers.

If it has been determined at Step S107 that switching of the light attenuation filter is to be performed (the case of YES), the process proceeds to Step S109, and the CPU 27 supplies a light quantity control signal to the laser module 21 to change the respective laser currents. Next, at Step S110, the CPU 27 supplies a switching signal to the filter drive circuit 28 to switch the light attenuation filter to one having a lower transmittance.

Note that at Step S109, it is stated as "change the laser currents" because if the light attenuation filter is switched to a filter having a lower transmittance to raise the brightness, there are two cases where the laser current is increased in one case, and decreased in the other case. This also applies to Step S114 as will be described later.

At Step S111, the CPU 27 determines whether the light attenuation filter is to be switched. If it has been determined at Step S111 that the light attenuation filter is not to be switched (the case of NO), the process proceeds to Step S112, and the CPU 27 supplies a light quantity control signal to the laser module 21 to decrease the current of each of the lasers.

If it has been determined at Step S111 that the light attenuation filter is to be switched (the case of YES), the process proceeds to Step S113, and the CPU 27 supplies a switching signal to the filter drive circuit 28 so as to switch to a light attenuation filter having a higher transmittance. Next, at Step S114, the CPU 27 supplies a light quantity control signal to the laser module 21 to change the respective laser currents.

Note that in FIG. 8, when switching the laser light quantity accompanied by switching of the light attenuation filter, cares should be taken in the following points. In the case of increasing the laser light quantity, for example, the following two patterns may be considered. The first pattern is a case of increasing the laser current and increasing the transmittance of the filter. The second pattern is a case of decreasing the laser current and increasing the transmittance of the filter (which means a case where an increased transmittance results in an excessive brightness, and the excess is finely controlled by the current).

Among these patterns, in the second pattern, if the transmittance of the filter is increased first, the light quantity of the projection image becomes higher than the target. This causes the user to be temporarily irradiated with an intense light quantity, and may generate danger of dazzling. Therefore, the laser current should be changed first. Thus, the flow is arranged as Steps S107 to S110.

In the case of decreasing the laser light quantity, the following two patterns may be considered in substantially the same line as above. The first pattern is a case of decreasing the laser current and decreasing the transmittance of the light attenuation filter. The second pattern is a case of increasing the laser current and decreasing the transmittance of the light attenuation filter.

Among these patterns, in the second pattern, if the laser current is increased first, the user would be temporarily irradiated with a projection image having a light quantity higher than the target. Therefore, the light attenuation filter should be switched first. Thus, the flow is arranged as Steps S111 to S114.

Meanwhile, when a human being moves from a brighter environment to a darker environment (or vice versa), the eyes do not get used to it soon. In general, light adaptation takes about one minute, and dark adaptation takes about 30 minutes. This is not the time taken for contraction and dilation of the pupils, but for decomposition and synthesis of a substance (rhodopsin) necessary for scotopic vision of the retina.

Therefore, in the display device 1, it is desirable that the CPU 27 controls the brightness of an image to the target value with a predetermined delay to a change in the quantity of external light. Specifically, it is favorable to control the light quantity with a predetermined delay (determined with respect to light adaptation (about one min) and dark adaptation (about 30 min)) in accordance with the eyes actually getting used to. Thereby, it is possible to avoid a problem that an image becomes dark faster than the eyes of a human getting used to it, for example, when moving to a dark environment (when moving outdoors to indoors, etc.).

Specifically, at Step S102 in FIG. 8, the target light quantity used for the control may be set to a value different from the true target light quantity, and then, gradually brought close to the true target light quantity. In other words, it may be controlled so as to reach the true target light quantity by taking a longer time than in a normal case. Alternatively, at Step S105 in FIG. 8, it is also possible to delay the control by multiplying the control quantity by any value less than 1. These measures enable to control the brightness in accordance with the eyes of the user getting used to an environment.

In this way, in the display device according to the embodiment, the quantity of external light around the user is detected, and based on a detected result, the laser current and the attenuation ratio of the light attenuation filter are controlled. Therefore, it is possible to reduce likelihood that the user feels that a projection image appears dark under a bright environment, or to the contrary, feels that a projection image appears bright under a dark environment. In other words, regardless of the brightness of external light, it is possible to project an image with an optimum brightness for the user.

Further, since the control of the laser current and the attenuation ratio of the light attenuation filter is automatically performed based on the light quantity obtained by the light quantity detection sensor, when the user moves from a brighter environment to a darker environment (or vice versa), it is possible to control the light quantity of a projection image without making the person feel discomfort. In addition, it is possible to solve the problem that the user dazzles with the laser light, or conversely, feels difficult to recognize information.

Also, since a projection image can be formed to have the same light quantity as the external light, it is possible to avoid a case in which either one of the external environment or the projection image is hard to recognize, or the user dazzles with the projection image. Therefore, even an application in which a projection image overlaps the external environment can be used by the user without any discomfort.

Also, since the brightness is controlled by both increasing/decreasing the laser current and switching the attenuation ratio of the light attenuation filter, it is possible to reduce the number of stages (number of filters) in the light attenuation filter. Also, it is possible to reduce deviation of the white balance in a low gradation region, which could be caused by controlling only the laser current.

Also, in a low gradation region around the threshold current of a laser, the light output with respect to the current is generally nonlinear. Therefore, in the low gradation, R/G/B colors not having an expected light quantity may not produce an expected color. In this regard, the display device 1 combines the control of the laser current with respect to external light, with the switching control of the light attenuation filter. Therefore, the display device 1 can readily use the linear region of the laser, and can output an expected color.

Further, by giving a delay in the control of the brightness in accordance with the dark adaptation and the light adaptation of human eyes, it is possible to realize a natural brightness change according to "adaptation" of the human eyes to the environment.

As above, preferred embodiments have been described. Note that the present invention is not limited to the above embodiments, and various changes and replacements can be made in the above embodiments without deviating from the scope of the present invention described in the claims.

For example, in the above embodiment, although an example has been described in which a display device projects an image only on the left eye, it is possible to configure the display device to be capable of projecting an image on both of the left eye and the right eye. In this case, the optical scanner 15, the lens 161, and the half mirror 162 may be mounted on each of the left and right temples 10t; the light quantity detection sensors 17 may be placed on the left and right one by one; and the control device 20 may be provided to control the brightness of images projected on the respective eyes. This enables to control the laser current and the light attenuation filter independently on each of the left and right sides, and enables to project an image having an appropriate light quantity on both eyes. This is effective for a case where different things are seen by the left and right eyes, for example, when looking into a magnifying glass with one of the eyes.

Also, in the above embodiment, although an example has been described in which the laser current and the attenuation ratio of the light attenuation filter are automatically controlled based on the light quantity obtained by the light quantity detection sensor, the laser current and the attenuation ratio of the light attenuation filter may be controlled manually by the user. For example, it may be configured such that the brightness of an image projected onto the eye of the user changes every time the user presses a switch provided on the control box. This enables to project an optimum light quantity according to the intention of the user.

Further, in the above embodiment, although the attachment part has a shape of eyeglasses, the attachment part does not need to have a shape of eyeglasses necessarily. For example, the attachment part having a built-in optical projection system may have a shape that is attachable and detachable on general eyeglasses worn by the wearer on the head. In this case, by configuring the attachment part to be attachable and detachable on either side of the eyeglasses on the right eye side or the left eye side, various users can use it in accordance with the dominant eye.

Also, in the above embodiment, although the light attenuation filter has a structure in which multiple filters having different attenuation ratios are arranged in a row so as to switch the filters, another structure may be adopted in which multiple filters are arranged such that they can be overlapped with each other, and the number of overlapping filters can be changed, so as to switch the attenuation ratio. In this case, the filters to be used may have the same attenuation ratio.

In addition, the display device according to the above embodiment can be applied not only to a retinal-scanning, head-mounted display, but also to various wearable terminals.

This international application is based on and claims priority to Japanese Patent Application No. 2016-085904 filed on Apr. 22, 2016, and the entire contents of Japanese Patent Application No. 2016-085904 are incorporated into this international application.

DESCRIPTION OF REFERENCE CODES 1 display device
10 attachment part
10f front
10t temple 15 optical scanner
16 optical projection system
17, 215 light quantity detection sensor
20 control device
20B control box
21 laser module
22 light attenuation filter
23 system controller
24 buffer circuit
25 mirror drive circuit
26 laser drive circuit
27 CPU
28 filter drive circuit
30 transmission cable
161 lens
162 half mirror
211R, 211G, 211B laser
221, 222, 223, 224, 225, 226, 227 filter
500 eyeball

The invention claimed is:

1. A display device to be mounted on a head of a user for allowing the user to view a predetermined image, the display device comprising:
   a light quantity detector configured to detect a light quantity of external light;
   a laser configured to emit a laser light having a light quantity depending on a current value;
   a light attenuator including a plurality of filters configured to switch an attenuation ratio so as to attenuate the laser light;
   an optical scanner configured to scan the laser light transmitted through the filter;
   an optical projection system configured to project the scanned laser light to form an image; and
   a controller configured to include a memory and a processor controlling brightness of the image by increasing or decreasing the current value and by switching the attenuation ratio of the filters, based on the light quantity of the external light detected by the light quantity detector,
   wherein the processor controls the brightness of the image to a target value, with a predetermined delay with respect to a change in the quantity of the external light, and
   wherein the predetermined delay is determined according to dark adaptation and light adaptation of a human eye, in consideration of the dark adaptation and the light adaptation of the human eye being realized by decomposition and synthesis of a substance necessary for scotopic vision, and realized by multiplying the current value by a value less than 1.

2. The display device as claimed in claim 1, wherein in a case of increasing the brightness of the image by decreasing the current value and by switching to a filter having a lower attenuation ratio from a filter having a higher attenuation ratio, the controller first changes the current value, and subsequently switches the filters.

3. The display device as claimed in claim 1, wherein in a case of decreasing the brightness of the image by increasing the current value and by switching to a filter having a higher attenuation ratio from a filter having a lower attenuation ratio, the controller first switches the filters, and subsequently changes the current value.

4. The display device as claimed in claim 1, wherein the controller increases or decreases the current value in a region where a relationship between the current value and the light quantity of the laser is linear.

5. The display device as claimed in claim 1, wherein the light attenuator includes the plurality of filters that have different attenuation ratios, and has a structure in which between a filter having a highest attenuation ratio and a filter having a lowest attenuation ratio, the plurality of filters are arranged in a row so as to vary the attenuation ratio in stages, and
   wherein one of the filters is selectively placed on an optical path of the laser light by a mechanism.

6. The display device as claimed in claim 1, wherein the optical projection system projects the image onto a retina of an eye of the user.

7. The display device as claimed in claim 1, wherein the display device includes
   an attachment part having a shape of eyeglasses to be mountable on the head of the user,
   a control device configured to control the attachment part, and
   a transmission cable configured to connect the attachment part with the control device,
   wherein the light quantity detector, the optical scanner, and the optical projection system are placed in the attachment part,
   wherein the laser, the light attenuator, and the controller are placed in the control device, and
   wherein the laser light is transmitted via the transmission cable.

8. A display device to be mounted on a head of a user for allowing the user to view a predetermined image, the display device comprising:
   a light quantity detector configured to detect a light quantity of external light;
   a laser configured to emit a laser light having a light quantity depending on a current value;
   a light attenuator including a plurality of filters configured to switch an attenuation ratio so as to attenuate the laser light;
   an optical scanner configured to scan the laser light transmitted through the filter;
   an optical projection system configured to project the scanned laser light to form an image; and
   a controller configured to include a memory and a processor, wherein the processor controls brightness of the image by increasing or decreasing the current value and by switching the attenuation ratio of the filters, based on the light quantity of the external light detected by the light quantity detector,
   wherein overlaps are provided in dimming steps for obtaining desired brightness for one filter having an attenuation ratio among the plurality of filters, and another filter having another attenuation ratio adjacent to the attenuation ratio of the one filter.

* * * * *